N. T. Fogg,
Pump Lift.

Nº 54,881. Patented May 22, 1866.

Witnesses;
William H. Clifford
Edward P. Furlong

Inventor;
Nelson T. Fogg

UNITED STATES PATENT OFFICE.

NELSON T. FOGG, OF LEWISTON, MAINE.

IMPROVEMENT IN PUMPS.

Specification forming part of Letters Patent No. 54,881, dated May 22, 1866.

*To all whom it may concern:*

Be it known that I, NELSON T. FOGG, of Lewiston, in the county of Androscoggin and State of Maine, have invented a new and useful Improvement in Pumps; and I hereby declare the following to be a full, clear, and exact description thereof, which will enable others to make and use my invention, reference being had to the accompanying drawings, making part of this specification, in which—

Figure 1:
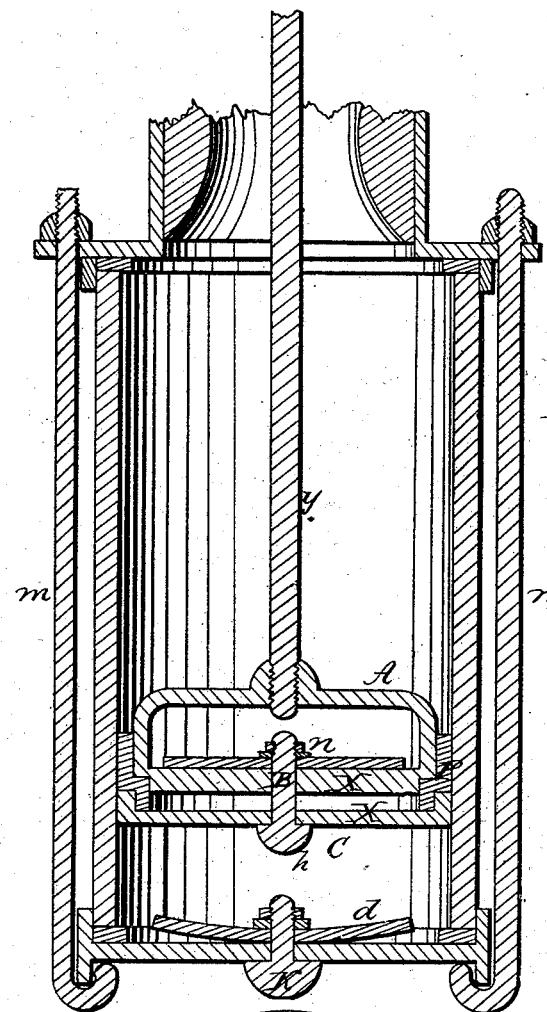
Figure 2:
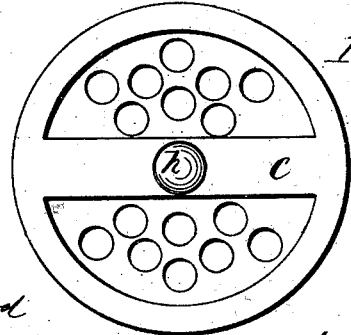

Figure 1 shows a section of a glass cylinder, plunger with valve-packing, and bottom check-valve, also the means of fastening the valves. Fig. 2 is a plan of the bottom of my improved plunger.

My invention consists in the combined employment of a bail, a double-headed screw, a cross-bar with a bottom check-valve, made as hereinafter described, and two fastening-rods for the cylinder.

In pumps as heretofore made, where a glass cylinder has been used, the rod is screwed and fastened immediately into and through the plunger, and is used to hold both the valve and packing in the plunger—the valve by a nut screwed on the rod and resting on the upper face of the valve; the packing by means of this and another nut at the bottom of the plunger, by which the parts of the box are compressed together. The consequence of this is that the rod sometimes works loose and the plunger is raised and lowered in an inclined position, or "canted" in one way or another, and the glass cylinder by this means is broken. This liability I obviate by the use of a bail to the plunger. The loosening of the rod allows also the valve and packing to get out of place, and thus the pump to become inefficient and useless. I secure both valve and packing by means of a screw having a nut at either end, one over the valve at its center, the other bearing against a bar stretching across the bottom of the plunger, the screw passing through the plunger. This at the same time firmly and durably holds the valve and packing and renders them independent of the working and looseness of the rod. The check-valve at the bottom of the plunger I make circular in form, and secure it at the center by a screw similar to the one used in the plunger.

In Fig. 1, A shows the bail into which the rod is screwed, and held by a nut at the bottom.

B shows the screw in the plunger. The upper end is fitted with the nut $n$, which rests upon the valve. The other or lower end is secured in the bar C by the head or nut $h$. $x\,x$ show the two parts of the plunger; P, the packing.

$d$, Fig. 1, shows the circular valve at the bottom of the pump, held by the double-headed screw K. The cross-bar C is seen in Fig. 2.

The glass cylinder has heretofore been held and secured by means of rods passing through ears attached to heads at the top and bottom of the cylinder, and having nuts at either end thereof. Greater security and simplicity are attained by fitting these side rods with hooks which clasp a rim at the bottom and with nuts at the top, thus dispensing with two ears for each rod, and having one only at the upper end of the rods.

$m\,m'$, Fig. 1, show the rods as I construct them.

Having thus described these several improvements, what I claim as my invention, and desire to secure by Letters Patent, is—

The described arrangement and combination of the rod $y$, the bail A, the screw B, the cross-bar C, valve $d$, screw K, and fastening-rods $m\,m'$, as and for the several purposes herein set forth.

NELSON T. FOGG.

Witnesses:
WILLIAM A. CLIFFORD,
EDWARD P. FURLONG.